United States Patent
Murata et al.

(10) Patent No.: US 7,502,597 B2
(45) Date of Patent: Mar. 10, 2009

(54) RADIO BASE STATION, MOBILE STATION

(75) Inventors: Syuuichi Murata, Yokohama (JP); Koji Sakai, Yokosuka (JP)

(73) Assignee: Fujitsu Limited, Kawasaki (JP)

( * ) Notice: Subject to any disclaimer, the term of this patent is extended or adjusted under 35 U.S.C. 154(b) by 353 days.

(21) Appl. No.: 11/192,099

(22) Filed: Jul. 29, 2005

(65) Prior Publication Data
US 2006/0198340 A1 Sep. 7, 2006

(30) Foreign Application Priority Data
Mar. 4, 2005 (JP) .............................. 2005-059794

(51) Int. Cl.
*H04B 7/05* (2006.01)
(52) U.S. Cl. ..................................... 455/95; 455/550.1
(58) Field of Classification Search ............... 370/328; 455/550.1, 95
See application file for complete search history.

(56) References Cited

U.S. PATENT DOCUMENTS 7,190,967 B2 * 3/2007 Kawai et al. ............. 455/550.1

OTHER PUBLICATIONS

3GPP TS 25.212; v6.2.0 (Jun. 2004); 3rd Generation Partnership Project; Technical Specification Group Radio Access Network; Multiplexing and Channel Coding (FDD) (Release 6).
3GPP TS 25.214; v6.2.0 (Jun. 2004); 3rd Generation Partnership Project; Technical Specification Group Radio Access Network; Physical Layer Procedures (FDD) (Release 6).

* cited by examiner

*Primary Examiner*—William D Cumming
(74) *Attorney, Agent, or Firm*—Hanify & King, P.C.

(57) ABSTRACT

To realize smooth adaptive modulation control after handover even when the transmission frequency of parameters is lowered with transmission of the parameters used for the adaptive modulation control with timing satisfying predetermined conditions. As the mobile station for transmitting the parameters used for the adaptive modulation control in the timing satisfying the predetermined conditions, a mobile station comprises a transmitting unit for transmitting the parameters with the timing not satisfying the predetermined conditions.

5 Claims, 9 Drawing Sheets

| CFN | SUB-FRAME No. | m | CQI TRANSMISSON ON/OFF |
|---|---|---|---|
| 0 | 0 | m0 | OFF |
| | 1 | m1 | OFF |
| | 2 | m2 | OFF |
| | 3 | m3 | OFF |
| | 4 | m4 | OFF |
| 1 | 0 | m0 | OFF |
| | 1 | m1 | OFF |
| | 2 | m2 | OFF |
| | 3 | m3 | OFF |
| | 4 | m4 | OFF |
| ~ | ~ | ~ | ~(OFF) |
| 15 | 0 | m0 | OFF |
| | 1 | m1 | ★ON |
| | 2 | m2 | OFF |
| | 3 | m3 | OFF |
| | 4 | m4 | OFF |
| ~ | ~ | ~ | ~(OFF) |
| 31 | 0 | m0 | OFF |
| | 1 | m1 | ★ON |
| | 2 | m2 | OFF |
| | 3 | m3 | OFF |
| | 4 | m4 | OFF |

TRANSMISSION PERIOD (K=160 MS)

Fig. 3

| CFN | SUB FRAME No. | m | CQI TRANSMISSION ON/OFF |
|---|---|---|---|
| 0 | 0 | m0 | OFF |
| | 1 | m1 | OFF |
| | 2 | m2 | OFF |
| | 3 | m3 | OFF |
| | 4 | m4 | OFF |
| ~ | ~ | ~ | ~(OFF) |
| 15 | 1 | m1 | OFF |
| | 2 | m2 | ★ON |
| | 3 | m3 | OFF |
| | 4 | m4 | OFF |
| ~ | ~ | ~ | ~(OFF) |
| 16 | 0 | m0 | ★ON |
| | 1 | m1 | OFF |
| | 2 | m2 | OFF |
| | 3 | m3 | OFF |
| | 4 | m4 | OFF |
| ~ | ~ | ~ | ~(OFF) |
| 31 | 0 | m0 | OFF |
| | 1 | m1 | ★ON |
| | 2 | m2 | OFF |
| | 3 | m3 | OFF |
| | 4 | m4 | OFF |

TRANSMISSION PERIOD (K=160 MS)

RADIO BASE STATION, MOBILE STATION

CROSS REFERENCE TO RELATED APPLICATION

This application is related to and claims priority to Japanese Application No. 2005-059794 filed Mar. 4, 2005 in the Japanese Patent Office, the contents of which are incorporated by reference herein.

BACK GROUND OF THE INVENTION

1. Field of the Invention

The present invention relates to a radio base station and a mobile station and more preferably to a radio base station and a mobile station used in the mobile radio communication system employing the W-CDMA (UMTS) communication system.

2. Description of the Related Art

Efforts for practical use of the HSDPA (High Speed Downlink Packet Access) as one of the data transmission systems using radio signals are now in progress (refer to non-patent document 1). The HSDPA enables high speed packet transmission for a downlink to realize a transmission rate of about 14 Mbps at maximum.

The HSDPA employs the adaptive modulation and coding system (AMC) and is characterized in adaptively switching the transmission method in accordance with the radio environment between the radio base station and mobile stations. For example, the transmission method may be switched between the QPS modulation scheme and the 16-QAM scheme.

Moreover, the HSDPA employs the H-ARQ (Hybrid Automatic Repeat request) system. In this H-ARQ system, when an error is detected in the received data from the radio base station, a re-transmission request is sent to this radio base station. The radio base station having received this re-transmission request re-transmits the data. Therefore, a mobile station performs the error correcting decoding process using the already received data and the received data re-transmitted. As explained above, in the H-ARQ system, if an error is generated, the number of times of re-transmission can be controlled by effectively utilizing the data already received.

The principal radio channels used in the HSDPA system include the HS-SCCH (High Speed-Shared Control Channel), HS-PDSCH (High Speed-Physical Downlink Shared Channel), and HS-DPCCH (High Speed-Dedicated Physical Control Channel).

Both HS-SCCH and HS-PDSCH are shared channels of the downlink (the direction to the mobile station from the radio base station) while the HS-SCCH is the control channel for transmitting various parameters for the data transmitted with the HS-PDSCH. Various parameters include the following parameters.

Modulation scheme information indicating the modulation scheme used

Assigned spreading code information

Pattern information of the rate matching process to be carried out before transmission Meanwhile, the HS-DPCCH is the dedicated control channel of the uplink (the direction to the radio base station from a mobile station). For example, this channel is used by the mobile stations to respectively transmit, to the radio base station, results such as acknowledgment and non-acknowledgment of reception of the data received from the radio base station via the HS-PDSCH as the ACK signal and NACK signal (response signals.

If a mobile station fails reception of data (when a CRC error is detected in the received data or the like) the radio base station executes the re-transmission control because the NACK signal is transmitted from the mobile station as the re-transmission request.

Moreover, if neither the ACK signal nor the NACK signal are received (in the case of DTX), the radio base station also performs the re-transmission. Therefore, entry into the DTX condition in which the mobile station does not transmit the ACK signal and the NACK signal can also be listed as one of the re-transmission requests.

Moreover, the HS-DPCCH channel is also used for transmitting, to the radio base station, reception quality information (for example, SIR) of the received signal from the radio base station measured with a mobile station as the CQI information (Channel Quality Indicator). The radio base station changes the transmission method of the downlink in accordance with the CQI information received.

Namely, the radio base station switches, when the CQI information suggests a good radio environment of the downlink, the transmission method to a modulation scheme enabling higher speed data transmission.

On the contrary, when the CQI information shows a bad radio environment of the downlink, the radio base station switches the transmission method to a modulation scheme enabling lower speed data transmission. Namely, adaptive modulation control is conducted.

Next, a channel format in the HSDPA system will be explained.

FIG. 1 is a diagram illustrating a channel format in the HSDPA system. Since the W-CDMA system employs a code division multiplex system, each channel is separated by the spreading code.

First, the channels not yet explained will be explained. The P-CPICH (Primary Common Pilot Channel) is the shared channel of the downlink and is used to transmit data to all mobile stations in a radio zone (cell).

The P-CPICH (hereinafter, referred to as CPICH) is the channel used for cell channel estimation, cell search. And the CPICH is used as the reference timing of the other physical downlink channels in the same cell and is the so-called channel for transmitting the pilot signal.

The DL-DPCH and UL-DPCH are dedicated channels of the downlink and the uplink which are individually set up in separation from the HSDPA channels.

Next, timings in the channel format will be principally explained with reference to FIG. 1.

As illustrated in the figure, each channel forms one frame (10 ms) with 15 slots (=3×5, #0 to #14). Each slot corresponds to the length of 2560 chips. As is explained above, since the CPICH is used as the reference for the other channels, the leading frames of the CCPCH (not illustrated) and HS-SCCH channels are matched with the leading frame of the CPICH channel.

Moreover, an SFN (System Frame Number) which is updated in units of one frame is assigned to each frame of the CPICH channel.

The leading frame of the HS-PDSCH channel is delayed by two slots from the HS-SCCH channel or the like in order to allow the mobile station to demodulate the HS-PDSCH channel in the demodulation scheme corresponding to the modulation scheme received after reception of the modulation scheme information via the HS-SCCH channel. Moreover, the HS-SCCH and HS-PDSCH channels form one sub-frame with three slots.

The HS-DPCCH is the uplink channel including the slot (the first slot in the sub-frame) used for transmission, to the radio base station from the mobile station, of the ACK/NACK signals as the response signals for verifying reception after about 7.5 slots from reception of the HS-PDSCH channel.

Moreover, the HS-DPCCH channel includes the slots (second and third slots in the sub-frame) used for periodic feedback transmission of the CQI information for adaptive modulation control to the radio base station. Here, the CQI information to be transmitted is calculated, for example, on the basis of the receiving environment (for example, result of SIR measurement of the CPICH channel) measured during the period before one slot from before four slots of the transmission of CQI.

Here, an example of calculation of the CQI information using a CQI table will be explained.

FIG. 2 is a diagram illustrating the CQI table.

For example, this table is stored in a storage unit of a mobile station to indicate correspondence between each CQI (1 to 30) and the receiving SIR of the CPICH.

Therefore, the mobile station obtains the CQI corresponding to the measured SIR with reference to this table and transmits the CQI information to the radio base station. The radio base station performs data transmission in the transport block size, code multiplexing level and modulation scheme or the like corresponding to the CQI.

Returning to explanation of FIG. 1, the leading frame of the DL-DPCH channel is deviated by D chips from the P-CPICH channel. The D is determined when a call (outgoing call) is originated from the mobile station or when a handover is carried out. When a call is set up, the D is fixed for such mobile station unless handover or the like is conducted.

On the other hand, the UL-DPCH is set with a deviation of 1024 chips from the DL-DPCH.

Here, a CFN (Connection Frame Number) which is updated in units of one frame is assigned to each frame of the UL-DPCH (DL-DPCH). The CFN may be set to the same number as the SFN, but the number deviated from the SFN can be assigned when a call is set up (at the time of occurrence of handover). Therefore, the CFN is different for each mobile station even with the same timing.

The CFN circulates among 0 to 255.

Moreover, basically, the CFN is sequentially updated when a call is established, and is also updated continuously even when the handover is conducted. However, if the handover is executed over the radio base station control apparatuses (RNC), it is also possible that different CFNs may be assigned again.

[Transmission Timing of CQI]

Next, the transmission timing of CQI will be explained.

First, parameters required for identifying the transmission timing of CQI will be explained.

[Parameter k]

k indicates the transmission cycle of the CQI and takes values with a step of 2 ms within the range from 0 to 160 ms.

[Parameter m]

Each m indicates the value obtained by dividing the number of chips between the leading frame of the UL-DPCH and the leading frame of each sub-frame of the HS-DPCCH with 256 chips. Five kinds of m0 to m4 may be used because five frames exist within one frame and these parameters m0 to m5 can take values equal to or larger than 101 but less than 251. Since 7680 chips (=2560×3) exist in one sub-frame, the parameters m0, m1, m2, m3, and m4 are separated respectively with the value 30.

With use of these parameters explained above, the transmission timing of CQI can be identified from the following formula 1.

$$(5 \times CFN + \lceil m \times 256(\text{chips})/7680(\text{chips}) \rceil) \bmod k' = 0 \quad (1)$$

Here, k'=k/2, [x]=minimum integer equal to or larger than x.

Namely, k' obtained from the parameter k is substituted for k' in the formula (1) and those satisfying the formula (1) among the available 256 kinds of CFNs and five kinds of ms are identified.

FIG. 3 illustrates the transmission timings of the CQI satisfying the formula (1) when the CQI transmission period k is set to 160.

FIG. 3 suggests that the transmission timing of CQI is defined with CFN=15 and sub-frame number=1 (second sub-frame among one radio frame).

Since the transmission period k has been 160, the CQI information can also be transmitted even with the sub-frame number 1 when the CFN is 31, which is incremented by 16.

Namely, when N is a natural number equal to or less than 16, the CQI is transmitted with the sub-frame number 1 of the CFN determined by 16(N−1)+15.

Items of the HSDPA system explained above are disclosed, for example, in the non-patent document 1, "3G TS 25. 212 (3rd Generation Partnership Project: Technical Specifications Group Radio Access Network; Multiplexing and channel coding (FDD) V6.2.0 (June, 2004)".

According to the background art explained above, the CQI as the parameter used for the adaptive modulation control is transmitted in the timing (sub-frame) satisfying predetermined conditions like formula 1 and also exists in the timing (sub-frame) not transmitted.

It is desirable from the viewpoint of not suppressing the capacity of the radio link that the CQI information is not transmitted for all sub-frames but that the CQI information is transmitted only to the limited sub-frames satisfying the predetermined conditions.

However, the radio base station as the handover destination receives first the CQI information in the timing (sub-frame) at which the mobile station satisfies first the conditions after the change over of channels under the handover control. Accordingly, in some cases, the radio base station as the handover destination cannot receive the CQI information during the period corresponding to the transmission period k of the CQI.

For example, when the communication is continued with the radio base station as the handover source until the CFN15 but the communication is made with the radio base station as the handover destination from the CFG16 under the precondition that the CFN is continued even after the handover in the example of FIG. 3, the mobile station cannot transmit the CQI information until the CFN reaches 31 after the handover is conducted.

In this case, the radio base station as the handover destination cannot receive for a long period the important parameters used for the adaptive modulation control, resulting in a serious problem thereto.

SUMMARY OF THE INVENTION

Accordingly, one object of the present invention is to assure smooth adaptive modulation control after the handover, even when the transmission frequency of parameters is lowered, by transmitting the parameters used for the adaptive modulation control with timing satisfying the predetermined conditions.

Another object of the present invention is to quickly start high speed adaptive modulation control after the handover.

In addition to the objects explained above, the effects attained by each structure of the best mode for carrying out the present invention explained later, which cannot be achieved with the background art, should be also understood as one of the objects of the present invention.

According to a first profile of the present invention, a mobile station for transmitting parameters used for adaptive modulation control in the timing satisfying the predetermined conditions is employed and this mobile station comprises a transmitting unit for transmitting parameters in a timing not satisfying the predetermined conditions after channel switching by handover.

Preferably, in the first profile, the transmitting unit returns the transmission timing of the parameters to the timing satisfying the predetermined conditions after the timing not satisfying the predetermined conditions.

Preferably, the transmitting unit returns the transmission timing of the parameters to the timing satisfying the predetermined conditions when the parameters are once transmitted in the timing not satisfying the predetermined conditions.

According to the second profile of the present invention, a radio base station for receiving the parameters used for adaptive modulation control in the timing satisfying the predetermined conditions is employed and this radio base station comprises a receiving unit for receiving the parameters transmitted in the timing not satisfying the predetermined conditions from a mobile station which has switched the channel due to the handover, and an adaptive modulation control unit for executing the adaptive modulation control for the mobile station using the parameters used with the receiving unit.

According to the third profile of the present invention, a timing control unit mounted in a mobile station for transmitting the parameters used for the adaptive modulation control in the timing satisfying the predetermined conditions is employed and this timing control unit comprises an acquiring means for acquiring the timing of the timing in handover, and a designating means for designating the timing not satisfying the predetermined conditions as the timing for transmitting the parameters after the timing acquired with the acquiring means.

According to the present invention, the adaptive modulation control even after the handover may be continued smoothly, even when the transmission frequency of parameters is lowered, by transmitting the parameters used for the adaptive modulation control in the timing satisfying the predetermined conditions.

Moreover, according to the present invention, the adaptive modulation control after the handover can be started at the higher speed.

BRIEF DESCRIPTION OF THE DRAWINGS

FIG. 3 shows CQI transmission timing.
FIG. 8 shows CQI transmission timing in the present invention.

DETAILED DESCRIPTION OF THE PREFERRED EMBODIMENTS

The preferred embodiments of the present invention will be explained with reference to the accompanying drawings.

[a]Explanation of a First Embodiment

In this embodiment, some considerations are taken into the transmission (reception) timing selected for the adaptive modulation control required after changeover of channel due to the handover.

Namely, a mobile station transmits parameters used for the adaptive modulation control in the timing determined on the basis of the predetermined parameters. However, after the changeover of channel because of handover, these parameters are transmitted with a timing other than that determined by the predetermined conditions (a timing quicker than that determined with the predetermined conditions).

Accordingly, the situation that the parameters cannot be transmitted, after the handover, until the predetermined conditions are satisfied can be avoided and thereby the adaptive modulation control can be realized smoothly.

Hereinafter, such considerations will be explained practically with reference to the accompanying drawings with the HSDPA explained above selected as an example.

Of course, the present invention may be adapted, in addition to the HSDPA system, to other radio communication systems in which handover is carried out. In this case, it is most desirable that the present invention is adapted to the system employing adaptive modulation control like the HSDPA system.

[Structure of Mobile Communication System]

Figure 4:
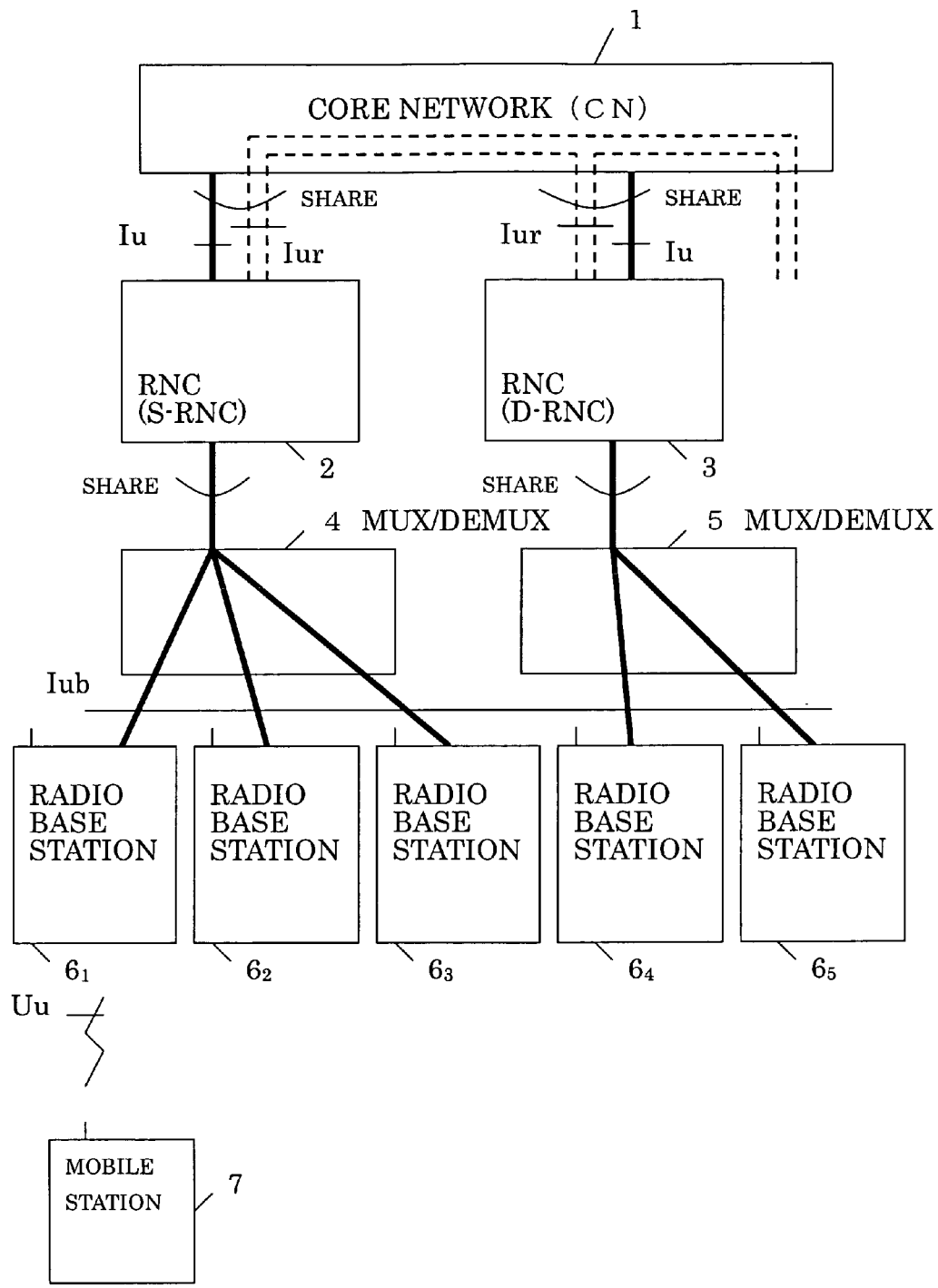
FIG. 4 shows a radio communication system in the present invention.

FIG. 4 illustrates an example of a structure of the mobile communication system of the present invention. Various systems can be assumed as the mobile communication system. In this example, the mobile communication system corresponding to the HSDPA system based on the W-CDMA (UMTS) is discussed as explained in the background art.

In FIG. 4, the reference numeral 1 denotes a core network; 2, 3, radio base station controller (radio network controller: RNC); 4, 5, MUX/DEMUX; $6_1$ to $6_5$, radio base station (BS); and 7, a mobile station (user equipment (UE)), respectively.

The core network 1 is used for routing in the mobile communication system. For example, the core network can be formed of an ATM exchange network, a packet exchange network and a router network or the like.

The core network 1 is located as a host (higher ranked) apparatus of the radio base stations (BSs) $6_1$ to $6_5$ and is also connected with the other public network (PSTN) or the like to enable communication between the mobile station 7 and subscribers of a fixed telephone system.

The radio network controllers 2, 3 are located as the host apparatuses of the radio base stations $6_1$ to $6_5$ like the apparatus forming the core network and are provided with the function to control these radio base stations $6_1$ to $6_5$ (management or the like of the radio resource used). Moreover, the radio network controllers are also provided with the function to perform the control of the handover process for changing over communication with the mobile station 7 to communication with the radio base station as the handover destination from communication with the radio base station as the handover source.

These RNCs 2, 3 may also be eliminated by assigning the functions thereof to the radio base station 6 and the core network 1. For example, the handover processing function unit may be provided in the side of the core network 1 and the radio channel assigning control function may be given to the radio base station 6.

Here, the MUX/DEMUXs 4, 5 are provided between the RNCs and radio base stations to demultiplex the signal to each radio base station received from the RNCs 2, 3 and also output these demultiplexed signals to each radio base station. These MUX/DEMUXs 4, 5 also transfer the signals to the corresponding RNCs by multiplexing the signals from each radio base station.

Of course, these MUX/DEMUXs may be eliminated by directly connecting the radio network controller and a plurality of radio base stations.

The radio base stations $6_1$ to $6_3$ conduct radio communications with the mobile station 7 under the control of the radio resource by the RNC2, while the radio base stations $6_4$, $6_5$ also conduct radio communications with the same under control by the RNC3.

The mobile station 7 establishes the radio link with the radio base station 6 when it is present within the radio area (cell) of the radio base station 6 and realizes communication with the other communication apparatuses via the core network 1. Moreover, even when the mobile station 7 moves, it can continue communication with the other communication apparatuses by changing over the radio base station as its communication partner through the handover process.

Here, the handover basically means that a mobile station changes over the radio base station as its communication partner. In this case, when a radio base station forms a plurality of radio areas (sectors) using a plurality of antennas, handover may also be required among the sectors. Moreover, handover is sometimes implemented among the radio base stations under the control of different RNCs.

Timing of the handover can be designated (designated to change over from the CFN16) to the mobile station 7 from the side of radio base station 6 as the handover source (for example, RNC2).

The mobile station 7 executes the handover by changing over each channel with the designated change-over timing.

In this case, it is desirable that the CFN is set to be continued before and after the handover and the switching is performed so that the mobile station 7 is capable of communicating with the radio base station as the handover source until the radio frame of the CFN15 and is capable of macommunicating with the radio base station as the handover destination when the CFN is changed to 16.

Basically, as the CFN, a deviated number is set if the number matching control is not conducted for every mobile station. Even when the handover is generated simultaneously in a plurality of mobile stations, the first CFN started after the handover is different for each mobile station and even if k is identical, the transmission timings of the CQI are naturally distributed.

Operation of the mobile communication system as the first embodiment illustrated in FIG. 4 has been explained above but the structure and operation of each node will then be explained in more details.

[Radio Network Controller 2 (3)]

Figure 5:
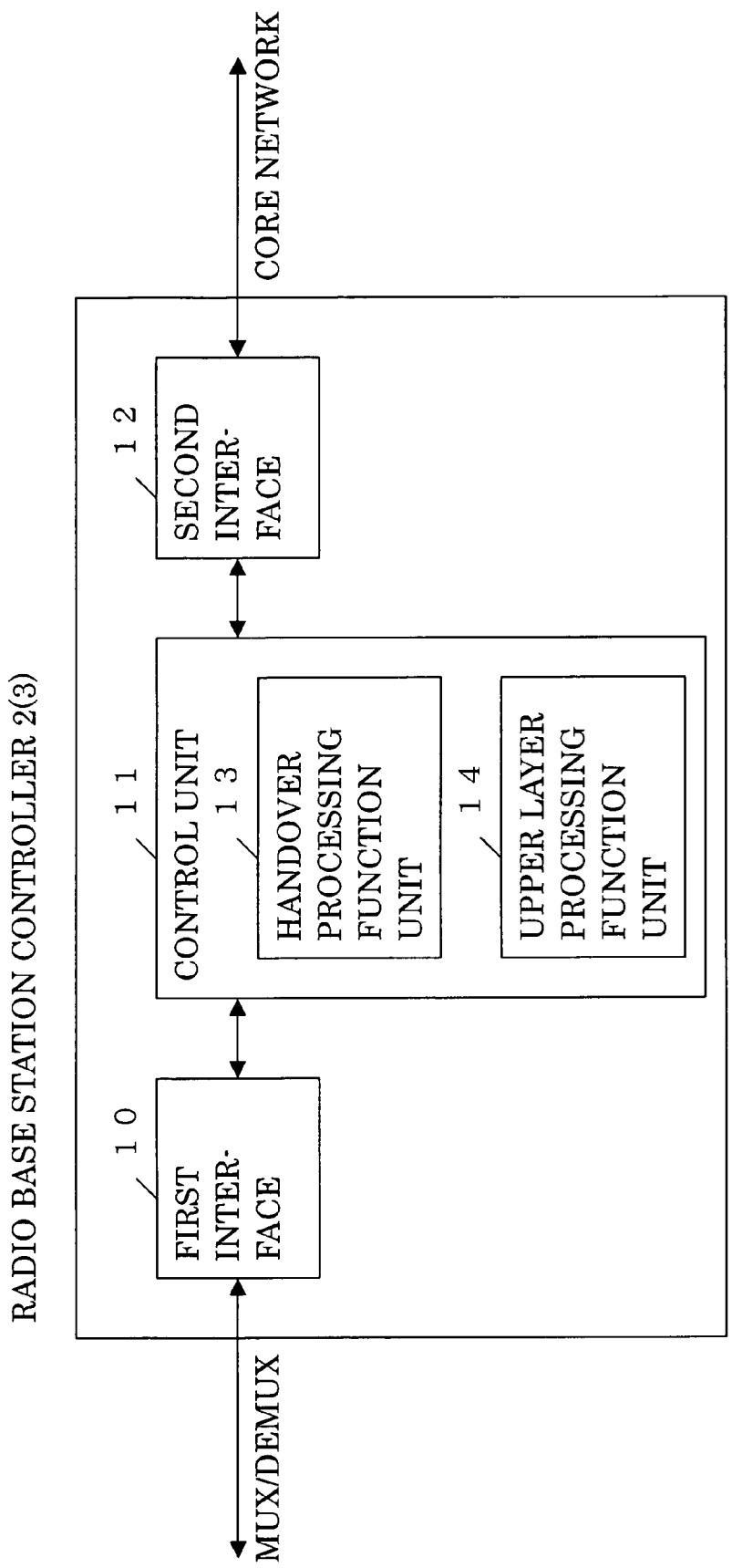
FIG. 5 shows a radio network controller in the present invention.

FIG. 5 illustrates the radio base station controller (radio network controller: RNC).

In this figure, numeral 10 denotes a first interface unit for communication with the MUX/DEMUX; 11, a control unit for controlling operations of each unit; 12, a second interface unit for communication with the core network side.

More preferably, the interface unit for transmission in accordance with the ATM system may be employed as the first and second interface units. Of course, transmission in accordance with another system may also be realized.

The control unit 11 controls the operation of each unit and includes a handover processing function unit 13 for conducting the processes (transfer process, radio channel assigning or the like) required for the handover process explained above and a processing unit 14 of the host (higher) layer such as the RLC (Radio Link Control) layer specified by the 3GPP mobile communication system.

Here, the timing (activation time) of the channel switching because of the handover is assumed to be indicated to the mobile station 7 from the handover processing function unit 13. Of course, such function may be given to the radio base station 6.

Next, operations for transmitting the signal from the side of the core network 1 to the side of the MUX/DEMUX 4 (5) will be explained.

The control unit 11 divides the data (for example, variable length packet data) obtained by the termination process in the second interface unit 12 for the signal received from the side of the core network 1 for every predetermined length to generate, for example, a plurality of RLC PDU (Packet Data Unit).

The control block 11 enters the serial number of each RLC PDU into the divided RLC PDU sequence number region in order to give the serial number to each PDU. This sequence number is used in the mobile station 7 to find out the missing numbers of PDU. If a missing number is found, the PDU sequence number which has not been received correctly from the mobile station is transmitted for the re-transmission control in the RLC layer. The control block 11 having received this sequence number (host layer processing function unit 14) re-transmits the transmitted RLC PDU to the mobile station 7 (the transmitted RLC PDU is stored as a copy in the memory or the like).

The control block 22 having generated the RLC PDU combines a plurality of RLC PDU and generates the format signal in accordance with the HS-PDSCH FP (frame protocol) to give such a format signal to the first interface unit 20 and transmit, for example, to the side of the MUX/DEMUX 4 (5) after formation into the ATM cell.

[Radio base stations 61 to 65]

Figure 6:
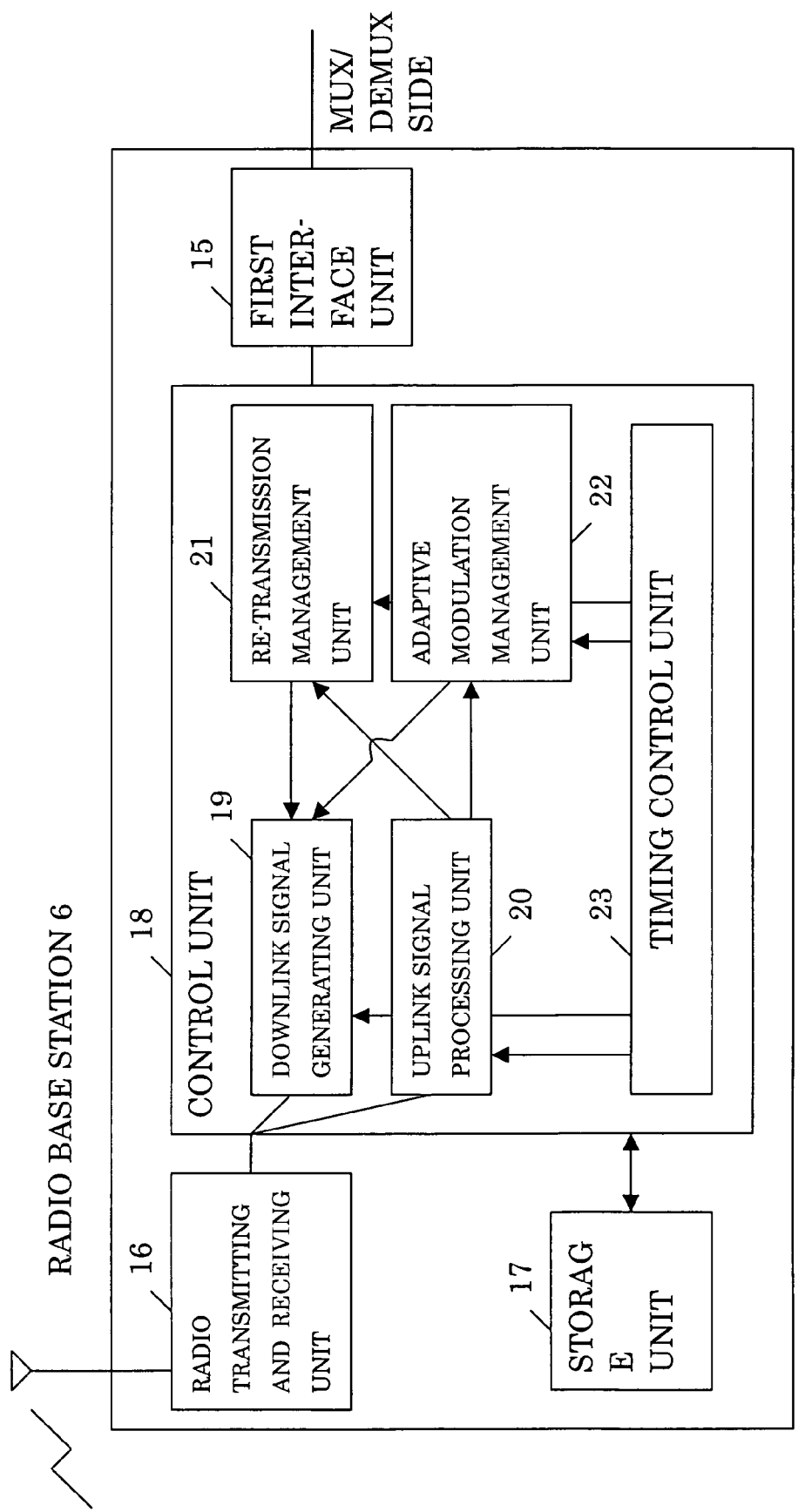
FIG. 6 shows a radio base station in the present invention.

FIG. 6 illustrates a structure of the radio base station 6 (BS).

In this figure, numeral 15 denotes the first interface unit for executing a termination process of the signal multiplexed and transmitted as the signal to the own station from the MUX/DEMUX 4 (5). Numeral 16 denotes a radio transmitting and receiving unit for transmitting and receiving the radio signal to the mobile station 7.

Numeral 17 denotes a storage unit for storing the transmitting data for re-transmission for the re-transmission control by the H-ARQ explained previously and the data in the transmission queue to be transmitted by the HS-PDSCH as the shared channel.

Numeral 18 denotes the control unit to control each unit including a downlink signal generating unit 19, an uplink signal processing unit 20, a re-transmission management unit 21, an adaptive modulation management unit 22, and a timing control unit 23.

Here, the downlink signal generating unit 19 generates the data to be transmitted as the downlink signal (data such as CPICH, HS-SCCH, HS-PDSCH), while the uplink signal processing unit 20 extracts the CQI information, ACK signal, NACK signal or the like from the uplink signal (HS-DPCCH) or the like.

Moreover, the re-transmission management unit 21 has the function for management of the re-transmission control in relation to the H-ARQ.

In addition, the timing control unit 23 performs timing control of each unit to acquire, for example, the CQI information transmitted from each mobile station under the predetermined conditions by controlling the radio transmitting and receiving unit 16 and the uplink signal processing unit 20 or the like and to control the timing for transmission of the data under the adaptive modulation control by the adaptive modulation control unit 22 with the predetermined sub-frame based on this receiving CQI.

Next, processing operations of the data received from the MUX/DEMUX 4 (5) will be explained.

First, the frames of the HS-PDSCH received via the first interface unit 15 are input to the control unit 18.

The control unit 18 stores the MAC-d PDU, included in the frames of the received HS-PDSCH, to a certain mobile station to the storage unit 17.

When it is detected that the transmission of data to such a mobile station via the HS-PDSCH as the shared channel is ready, the MAC-d PDU addressed to the mobile station from the storage unit 17 is sequentially extracted and the MAC-hs PDU including a plurality of MAC-d PDU is generated. The number of MAC-d PDU to be extracted is selected so that it is accommodated within the transport block size determined with the CQI information.

The MAC-hs PDU forms a transport block which is the source of the data to be transmitted to the mobile station 7 via the HS-PDSCH.

The MAC-hs PDU includes the TSN (Transmission Sequence Number) which is the sequence number given to the PDU and enables re-arrangement of the transport blocks in accordance with this sequence number even when the HS-PDSCH is transmitted to the mobile station 7 by dividing such transmission process into a plurality of processes.

The MAC-hs PDU generated in the control unit 18 is stored into the storage unit 17 for executing the re-transmission control by the H-ARQ and is also input to the downlink signal generating unit 19 for execution of error correction coding and error detection coding processes. Thereby one sub-frame of the HS-PDSCH is formed and it is then sent to the radio transmitting and receiving unit 16 together with the other signals. Accordingly, this sub-frame is transmitted to the mobile station 7 via the HS-PDSCH.

However, as explained above, before actual transmission of the HS-PDSCH, transmission is forecasted to the mobile station 7 via the HS-SCCH.

Namely, the control unit 18 applies, before transmission of the HS-PDSCH, the data to be transmitted via the HS-SCCH to the downlink signal generating unit 19, and this downlink signal generating unit 19 generates one sub-frame of the HS-SCCH based on the given data and then transmits this one sub-frame to the radio transmitting and receiving unit 16.

The mobile station 7, having received the notice for transmission by the HS-SCCH and the HS-PDSCH, transmits the result (ACK signal or NACK signal) of reception of the HS-PDSCH via the HS-DPCCH.

The uplink signal processing unit 20 of the radio base station 6 executes the reception process of the uplink signal (HS-DPCCH or the like) from the mobile station 7 and notifies the detected result to the re-transmission management unit 21, when it is detected that the receiving result is the NACK signal.

The re-transmission management unit 21 reads the MAC-hs PDU that failed in transmission from the storage unit 17, applies again such MAC-hs PDU to the downlink signal processing unit 19, to control the radio transmitting and receiving unit 16 to execute re-transmission.

Meanwhile, when the uplink signal processing unit 20 detects that the receiving result of the HS-PDSCH is the ACK signal, re-transmission control is unnecessary. Accordingly, the control unit 18 reads the MAC-d PDU, which is not yet transmitted (in the transmission queue), being stored in the storage unit 17 in view of transmitting the next new transport block and generates the new MAC-hs PDU and then gives it to the downlink signal generating unit 19. Thereby, the radio transmitting and receiving unit 16 is controlled to transmit the new MAC-hs PDU.

Operations for H-ARQ (re-transmission control) in the radio base station have been explained above. As is already explained above, since the adaptive modulation control is executed in the radio base station 6 in the HSDPA, the CQI information is received from the mobile station 7.

Even in this example, the mobile station 7 does not transmit the CQI information for every sub-frame but transmits it with limitation (intermittently) only to the sub-frame which satisfies the predetermined conditions.

Preferably, the mobile station 7 transmits the CQI information to the radio base station 6 with the sub-frame satisfying the formula (1) explained above and the radio base station 6 receives this CQI information. However, in this embodiment, the CQI information is transmitted from the mobile station 7 when the formula (1) is not satisfied and the radio base station 6 receives in some cases the CQI information. These processes will be explained later.

Since the CQI information is received by the uplink signal processing unit 20, this uplink signal processing unit 20 applies this CQI information to the adaptive modulation management unit 22.

The adaptive modulation control in accordance with the CQI information in the radio base station 6 can also be performed as explained previously.

[Mobile Station 7]

Next, structure and operation of the mobile station will be explained.

Figure 7:
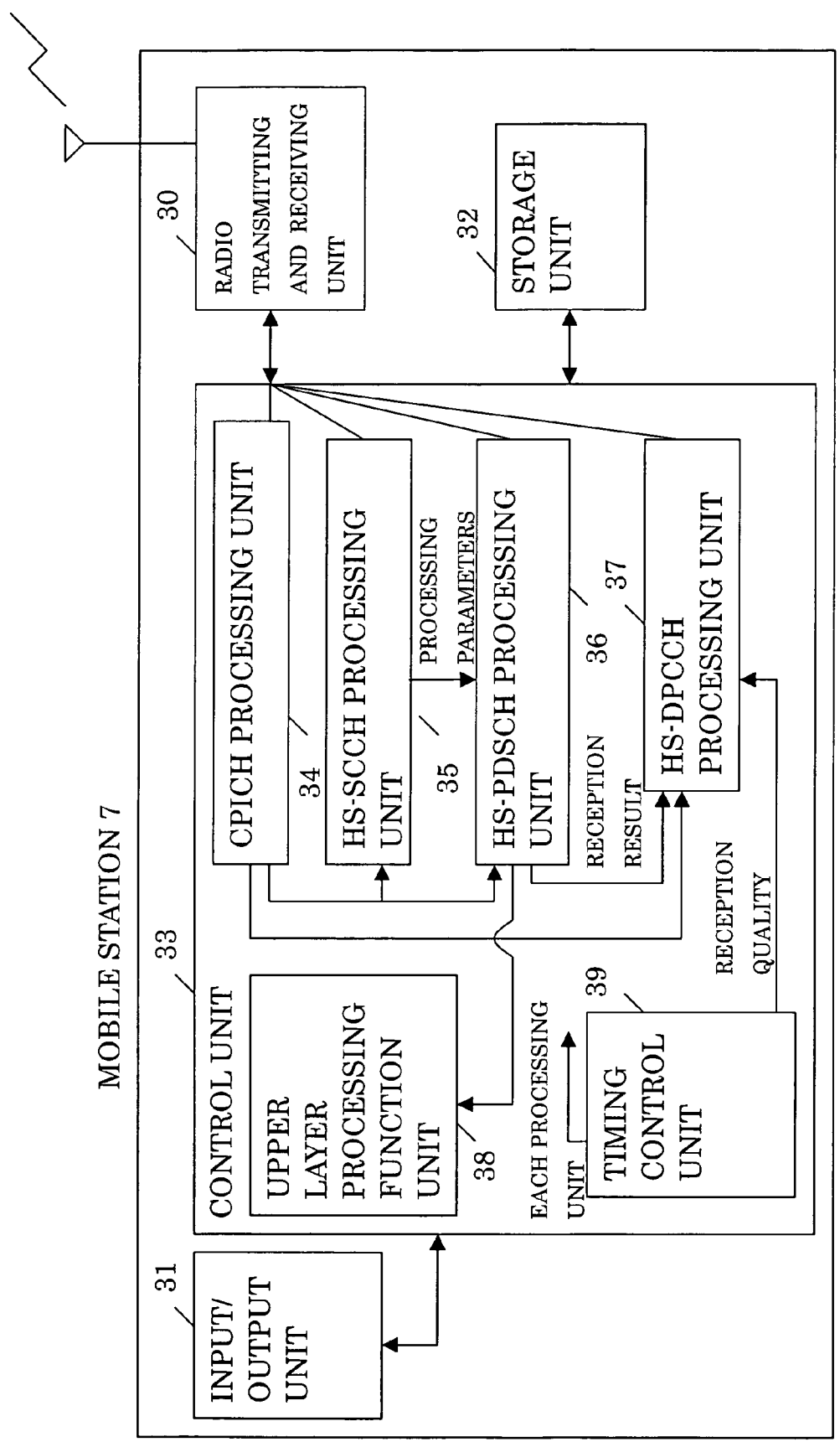
FIG. 7 shows a mobile station in the present invention.

FIG. 7 illustrates a structure of the mobile station 7. In this figure, numeral 30 denotes a radio transmitting and receiving unit for radio communication with the radio transmitting and receiving unit 16 of the radio base station 6; 31, an input/output unit for inputting voices and data and outputting the received voices and data.

Numeral 32 denotes a storage unit for storing the various data required. This storage unit is also used to temporarily store the data having generated a receiving error to realize the H-ARQ.

Numeral 33 denotes a control unit for controlling each unit. This control unit includes a CPICH processing unit 34, an HS-SCCH processing unit 35, an HS-PDSCH processing unit 36, an HS-DPCCH processing unit 37, a upper (host) layer processing unit 38, and a timing control unit 39.

The CPICH processing unit 34 receives the CPICH transmitted continuously from the radio base station 6 in the measuring section or the like and applies the measuring result of the reception quality (receiving SIR) to the HS-DPCCH processing unit 37. Moreover, this unit 34 also applies the phase information on the IQ plane of the pilot signal obtained by the receiving process of the CPICH to the HS-SCCH processing unit 35 and HS-PDSCH processing unit 36 or the like for enabling the synchronous detection (channel compensation).

Moreover, the mobile station 7 performs the feedback transmission of the CQI information for the adaptive modulation control to the radio base station in accordance with the formula (1) via the HS-DPCCH during reception of the HSDPA service. However, after the handover, the transmission of the CQI information not conforming to the formula (1) is also conducted.

Here, the CQI information to be transmitted should be assumed as the CQI information, for example, corresponding to the result of measurement performed during the period before one slot from before three slots of the transmission of CQI.

Figure 1:
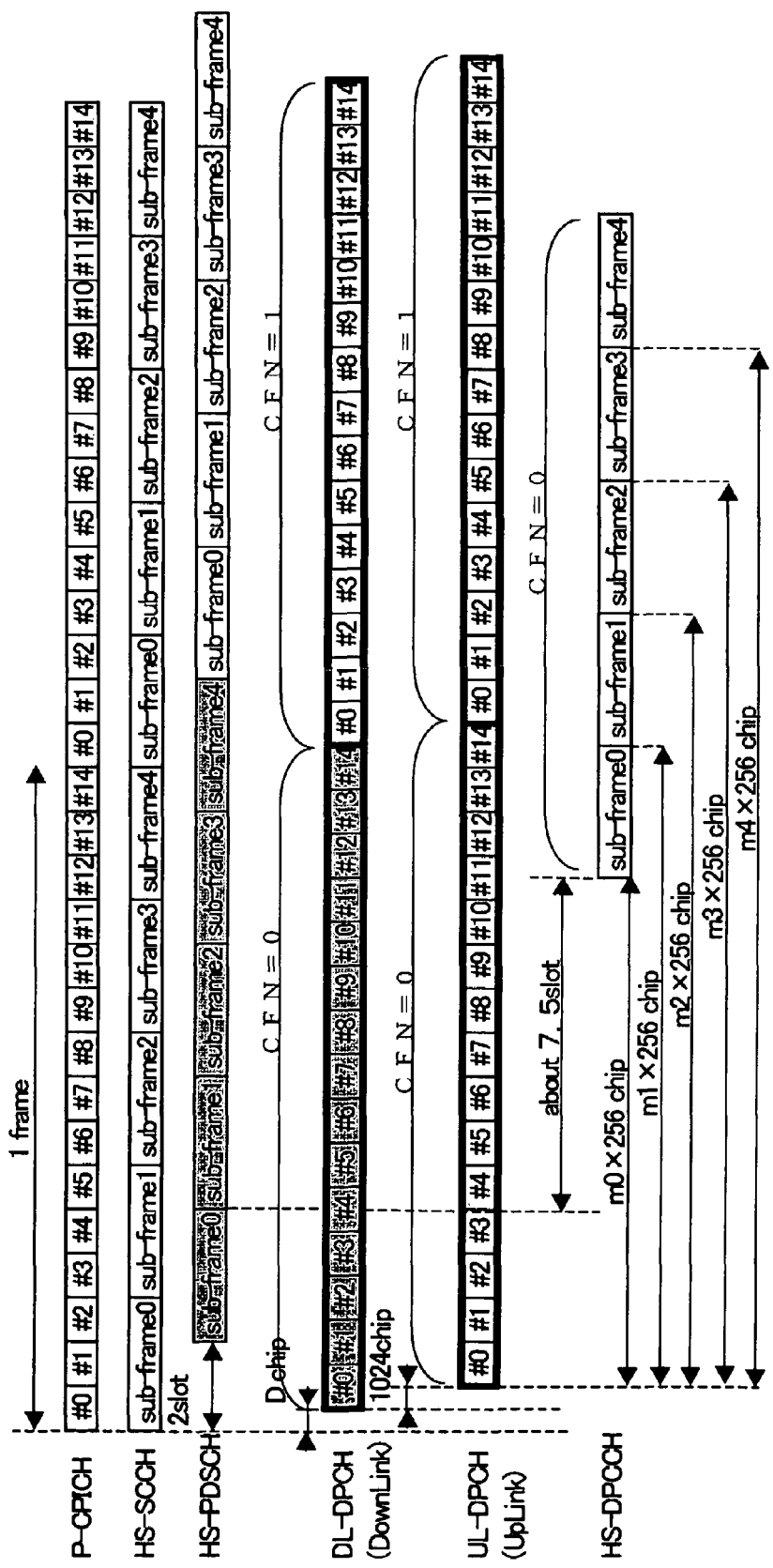
FIG. 1 shows channel format in the HSDPA.
Figure 2:
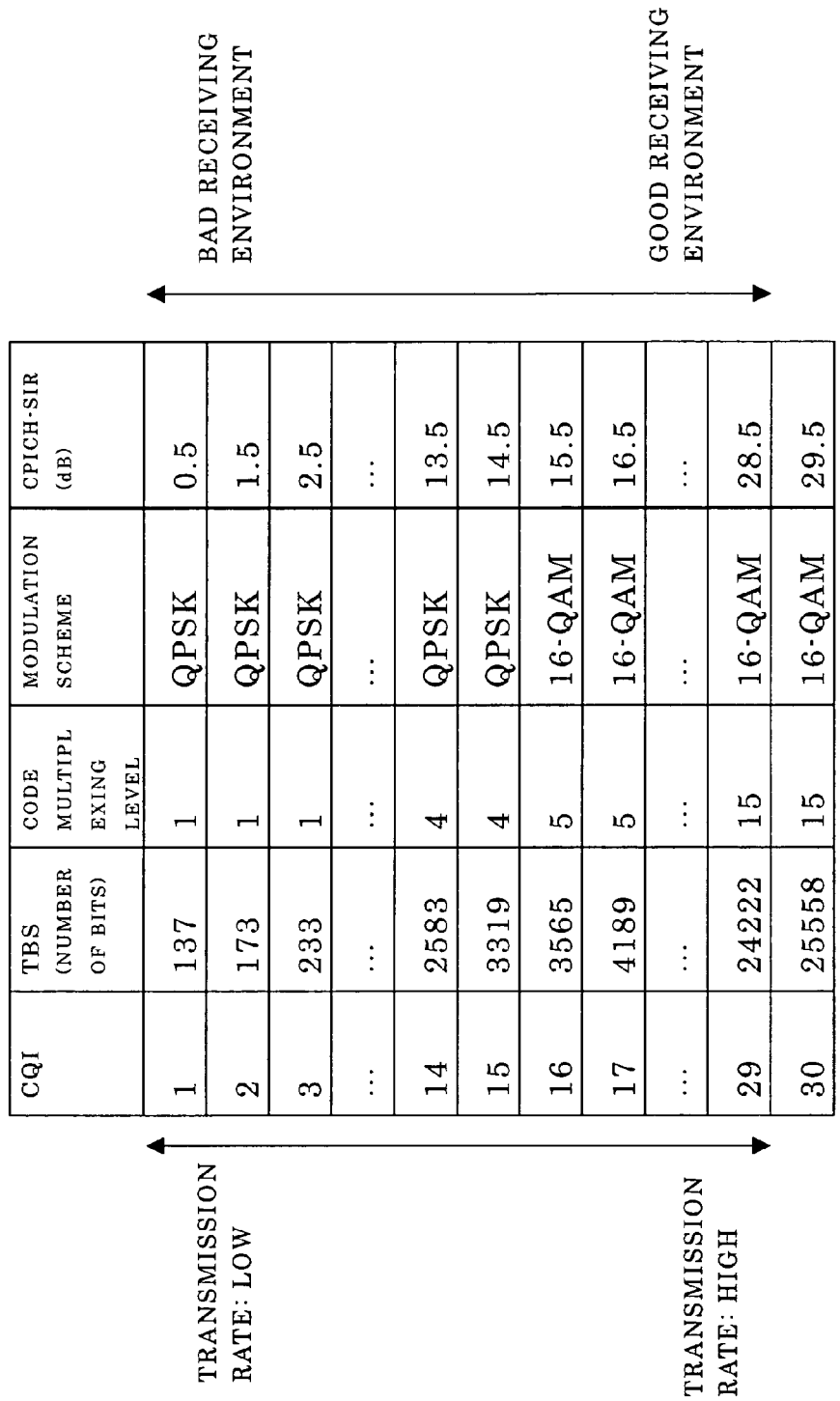
FIG. 2 shows a CQI table.

Correspondence (for example, the CQI table in FIG. 2) between the receiving quality (receiving SIR) and the CQI information is stored in the storage unit 32 and the CQI information to be transmitted can be determined by selecting the CQI information corresponding to the receiving quality.

The HS-SCCH processing unit 35 performs the receiving process of the HS-SCCH transmitted from the radio base station 6 for each sub-frame to check whether transmission of the data via the HS-PDSCH to the own station is forecast or not.

Namely, the first part of the HS-SCCH is received and whether such part has been transmitted to the own station or not on the basis of the result (for example, likelihood information) obtained by multiplying and decoding the inherent (assigned) code of the own station.

Here, when transmission to the own station is detected, the receiving process of the remaining second part is completed and the receiving error is detected on the basis of the error detection bit added for the entire part of the first and second parts. If an error is detected by the HS-SCCH processing unit 35, the process in the HS-PDSCH processing unit may be interrupted on the basis of the judgment that an error has been detected in the forecast.

The HS-SCCH processing unit 35 having detected the forecast of transmission to the own station notifies a message to the HS-PDSCH processing unit 36 to receive one sub-frame of the HS-PDSCH after two slots.

In this case, the code information and modulation scheme notified in the part 1 of the HS-SCCH from the radio base station 6 are also indicated.

Accordingly, the HS-PDSCH processing unit 36 can start the receiving process of the HS-PDSCH and complete the receiving process of the HS-PDSCH (de-rate matching, error correction decoding or the like) by acquiring, for detection of error in the decoding result, the information included in the remaining second part from the HS-SCCH processing unit 35 for such receiving processes.

Here, the HS-PDSCH processing unit 36 indicates existence of a CRC error in the decoding result for the HS-PDSCH to the HS-DPCCH processing unit 37. Moreover, the re-arrangement process (re-ordering) is conducted on the basis of the TSN included in the MAC-hs PDU obtained by the decoding and the data after the reordering process is transferred to the higher (host) layer processing function unit 38.

The higher (host) layer processing function unit 38 determines whether a missing number exists or not in the sequence number included in the MAC-d PDU. When the missing number is detected, it is notified to the radio network controller 2 (3) via the dedicated channel provided additionally to execute the re-transmission control in the RLC layer.

The received data obtained sequentially is output (audio output, video output or the like) sequentially also in the corresponding output format from the input/output unit 31.

The HS-DPCCH processing unit 37 selects the parameter (parameter CQI used for the adaptive modulation control in the radio base station 6) corresponding to the receiving quality given from the CPICH processing unit 34 based on the correspondence (CQI table) stored in the storage unit 32 and transmits the selected parameter to the radio base station 6 via the HS-DPCCH. Moreover, the HS-DPCCH processing unit 37 transmits the receiving result as the response signal (ACK signal, NACK signal) via the HS-DPCCH in accordance with a notice indicating existence or non-existence of an error from the HS-PDSCH processing unit 36.

Namely, the HS-DPCCH processing unit 37 applies the ACK signal when an error does not exist or the NACK signal when an error exists to the radio transmitting and receiving unit 30.

The timing control unit 39 is provided with the function for the timing control of each unit in order to control each unit to execute the handover by switching the channel, for example, in the notified handover timing.

With the structure explained above, the mobile station 7 checks each sub-frame of the HS-SCCH, obtains the decoding result by receiving, demodulating, and decoding (turbo decoding) one sub-frame of the HS-PDSCH after two slots upon reception of a notice that data transmission to the own station is conducted via the HS-PDSCH, determines acknowledgment or non-acknowledgment of reception with the CRC calculation using the CRC bit, stores the received data to the storage unit 32 if reception is not acknowledged, and transmits the NACK signal to the radio base station 6 via the HS-DPCCH.

When the radio base station 6 executes the re-transmission, the data stored in the storage unit 32 and the re-transmitted data are combined and are then decoded (by the turbo decoding). The decoded data is then subjected again to the CRC check.

When YES (no error) is the result of the CRC check, the HS-DPCCH processing unit 37 controls the radio base station 6 to transmit the ACK signal via the HS-DPCCH.

Moreover, re-ordering is conducted based on the TSN included in the MAC-hs PDU obtained by the decoding and the MAC-d PDU (RLC PDU) included in the transport block after the reordering is transferred to the upper (host) layer processing unit 38.

The upper (host) layer processing function unit 38 conducts the reordering using the sequence number included in the RLC PDU and then detects the missing number and checks the polling bit.

If the missing number is detected here, the RLC processing function unit of the mobile station 17 transmits the sequence number of the PDU which has not been received correctly due to the re-transmission control in the RLC layer to the radio network controller 2 (3) via the dedicated physical channel (DPCH) established additionally.

The ACK signal transmission-controlled by the upper (host) layer processing function unit 38 of the mobile station 7 and the sequence number of the PDU not received correctly are transmitted to the radio network controller 2 (3) via the radio base station 6 and MUX/DEMUX 4 (5).

The control unit 11 of the radio network controller 2 (3) reads, upon reception of the sequence number which cannot be received correctly from the upper (host) layer processing unit 38 of the mobile station 7, the data (HS-PDSCH frame) to be retransmitted from the storage unit (not illustrated) and then conducts the re-transmission.

The structure and operation of each unit have been explained above. Transmission of the CQI information before and after the handover will be explained in detail.

[CQI Transmission Before Handover]

Figure 9:
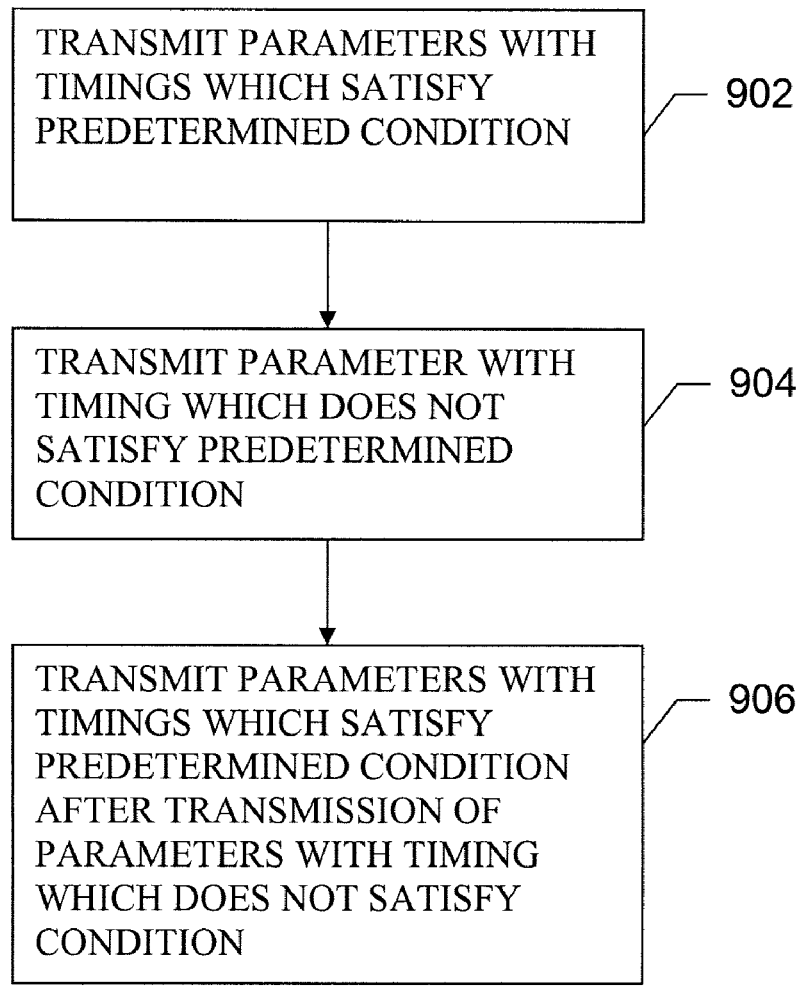
FIG. 9 shows a method of operation of the present invention.

As explained previously, before the handover, the timing control unit 39 controls the HS-DPCCH processing unit 37, conforming to the formula (1), to transmit the CQI information with the sub-frame satisfying the predetermined conditions. (See step 902 in FIG. 9)

Preferably, the mobile station 7 previously stores a program for obtaining, by calculation, a solution satisfying the formula (1) using the CQI transmission period k indicated from the side of the radio base station 6 and m0 to m4 which maybe identified with establishment of a call and then controls, in accordance with such program, to transmit the CQI information in the sub-frame of the CFN which are determined by the solution obtained.

[CQI Transmission After Handover]

Upon reception of the instruction (for example, instruction for switching the channel from the CFN16) of handover timing (activation time) from the side of the radio base station 6 via the dedicated channel (not illustrated) (DL-DPCH), the timing control unit 39 switches the channels DL-DPCH, UL-DPCH, HS-DPCCH or the like in accordance with this instruction.

Namely, the communication with the radio base station as the handover source is switched to the communication with the radio base station as the handover destination from the start timing of CFH16. The channel switching is also conducted as the same CFN for the P-CPICH before the D chip. In the same manner, the channel switching is also conducted for the HS-SCCH, HS-PDSCH or the like.

However, regarding the transmission timing of CQI, the timing control unit 39 controls the HS-DPCCH processing unit 37 to conduct the transmission in the timing not satisfying the predetermined conditions (for example, formula (1)). (See step 904 in FIG. 9)

For example, when conforming to the transmission period k and formula (1), it is assumed that the CQI is transmitted with the second sub-frame of the CFN15 and the next transmission of CQI is not conducted with the CFN31.

When it is assumed that the mobile station 7 has received the instruction to switch the channel due to the handover from the CFN16, the timing control unit 39 controls the HS-DPCCH processing unit 37 to transmit the CQI information in the CFN16 not satisfying the conditions of the formula (1).

Namely, the transmission is conducted with the CFN before that satisfying first the conditions after the handover. (See step 906 in FIG. 9)

Accordingly, when considering the transmission before and after the handover, the transmission period temporarily becomes shorter than k but the time in which the radio base station 6 as the handover destination cannot obtain the CQI information after the handover becomes short and thereby the adaptive modulation control may be started quickly.

In this example, the CQI information is transmitted with the first CFN after the channel is switched, but this CFN is set before the second sub-frame of the CFN31, it is apparent that the adaptive modulation control can be started quickly to a certain extent.

Here, it is more desirable that the CQI information to be transmitted is obtained on the basis of the reception quality of the CPICH received from the radio base station as the handover destination. Moreover, the timing control unit 39 is desirably controls the CPICH processing unit 34 to execute the measurement of the CPICH preceding the transmission of CQI information.

Moreover, it is desirable that transmission of the CQI information in the timing not satisfying the conditions of the formula (1) as explained above is determined to be done once after the handover and thereafter the conditions of the formula (1) are satisfied. The reason is that if the CQI information is transmitted continuously in the period k with reference to the timing not satisfying the conditions of formula (1), the CQI information is always transmitted (k is equal in each mobile station or in the relation of the N-time (N is a natural number) ) in almost the same timing when a plurality of mobile stations perform simultaneously the handover and thereby the processing load in the radio base station is likely to increase in this timing.

Since the timing control unit 23 of the radio base station 6 recognizes, in the same manner, the timing of the channel switching because of the handover, the CQI information irregularly transmitted can be received, after the handover, and it may be used for the adaptive modulation control by controlling the uplink signal processing unit 20 or the like to receive the CQI information even with the first CFN (second CFN or the like may also be allowed) without relation to the conditions of the formula (1).

[Others]

Finally, a certain modification using k will be explained.

In this example, either mode 1, where the CQI information is transmitted even if the formula (1) is not satisfied after the handover, or mode 2, where the CQI information is never transmitted if the formula (1) is not satisfied, is selected in accordance with a value of k.

Namely, the mobile station 7 shifts to mode 1 after the handover and thereafter shifts to mode 2 when the value of k has exceeded the predetermined reference value (for example, 80 ms).

Meanwhile, the mobile station 7 shifts to mode 2 after the handover when the notified value of k does not exceed the predetermined reference value (for example, 80 ms).

Of course, the radio base station 6 performs mode selection with the same reference to receive the CQI information.

According to this process, the particular control can be realized with limitation to the case where in the probability of generation of delay of the start timing of the adaptive modulation control is high and thereby the processing load for particular process can be eased.

Moreover, in the other example, the timing control unit 39 of the mobile station 7 determines, after the handover, whether the time up to the first transmission of the CQI information exceeds or does not exceed the predetermined reference time (for example, 80 ms) in accordance wit the formula (1).

If above time exceeds the reference time, the mobile stations shift once to mode 1 and thereafter shift to mode 2. When the time does not exceed the reference time, the mobile station 7 shifts to mode 2.

Accordingly, transmission of the CQI information can surely be compensated in a limited case where the CQI transmission delay, which can't be ignored, occurs.

What is claimed is:

1. A mobile station used in a mobile communication system, the mobile station comprising:
    an antenna to communicate with a base station; and
    a radio transmitting unit which transmits a parameter used for adaptive modulation control in a base station via the antenna with any timing which satisfies a predetermined condition and which transmits a parameter used for adaptive modulation control in the base station with a timing which does not satisfy the predetermined condition after channel switching due to a handover.

2. The mobile station according to claim 1, wherein the radio transmitting unit transmits a parameter used for adaptive modulation control in the base station via the antenna with any timing which satisfies the predetermined condition after the timing which does not satisfy the predetermined condition.

3. The mobile station according to claim 1, wherein the radio transmitting unit transmits a parameter used for adaptive modulation control in the base station via the antenna with any timing which satisfies the predetermined condition after transmission of the parameter used for the adaptive modulation control in the base station with the timing which does not satisfy the predetermined condition.

4. A parameter transmission method used in a mobile station, the method comprising:
    transmitting parameters used for adaptive modulation control in a base station with timings which satisfy a predetermined condition; and
    transmitting a parameter used for adaptive modulation control in the base station with a timing which does not satisfy the predetermined condition after channel switching due to a handover.

5. The parameter transmission method according to claim 4, further comprising
    transmitting parameters used for adaptive modulation control in the base station with timings which satisfy a predetermined condition after transmission of the parameter used for the adaptive modulation control in the base station with the timing which does not satisfy the predetermined condition after the channel switching due to the handover.

* * * * *